(12) United States Patent
Prager

(10) Patent No.: US 7,013,851 B2
(45) Date of Patent: Mar. 21, 2006

(54) INTAKE ARRANGEMENT

(75) Inventor: André Prager, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/058,257

(22) Filed: Feb. 16, 2005

(65) Prior Publication Data

US 2005/0188952 A1 Sep. 1, 2005

(30) Foreign Application Priority Data

Feb. 26, 2004 (DE) .................. 10 2004 009 310

(51) Int. Cl.
*F02B 33/04* (2006.01)
(52) U.S. Cl. .................. 123/73 PP; 123/73 A
(58) Field of Classification Search ............. 12/73 PP, 12/73 R, 73 A, 376, 337; 261/23.1, 23.3
See application file for complete search history.

(56) References Cited

U.S. PATENT DOCUMENTS

| | | | | |
|---|---|---|---|---|
| 2,998,232 A | * | 8/1961 | Louis | ................ 261/36.2 |
| 3,171,868 A | * | 3/1965 | Hamilton | ................ 261/39.3 |
| 6,634,326 B1 | * | 10/2003 | Radel et al. | ............. 123/73 PP |
| 6,889,637 B1 | * | 5/2005 | Rosskamp | ............. 123/73 PP |
| 2003/0106508 A1 | | 6/2003 | Rosskamp | |
| 2004/0051186 A1 | * | 3/2004 | Gerhardy et al. | ............. 261/43 |
| 2005/0051118 A1 | * | 3/2005 | Hoche et al. | ............. 123/73 A |

* cited by examiner

*Primary Examiner*—Mahmoud Gimie
(74) *Attorney, Agent, or Firm*—Walter Ottesen

(57) ABSTRACT

An intake arrangement (1) for a two-stroke engine includes an intake channel (2) in which a throttle flap (3) is pivotally journalled with a throttle shaft (4). Downstream of the throttle flap (3), a partition wall (8) is mounted on the intake channel (2) and this partition wall partitions the intake channel (2) into an air channel (6) and a mixture channel (7). In the idle position (5) of the throttle flap (3), at least one fuel opening (14) opens into the mixture channel (7) downstream of the throttle flap (3). A connecting opening (16) between the air channel (6) and the mixture channel (7) is provided between the partition wall (8) and the throttle shaft (4) in the idle position (5) of the throttle flap (3). A shield (20, 30) is mounted in the mixture channel (7) between the fuel opening (14) and the connecting opening (16) in order to achieve a good swing performance of the two-stroke engine. The shield reduces the passing of fuel into the air channel and therefore the degree of wetting of the air channel with fuel.

17 Claims, 2 Drawing Sheets

INTAKE ARRANGEMENT

CROSS REFERENCE TO RELATED APPLICATION

This application claims priority of German patent application no. 10 2004 009 310.5, filed Feb. 26, 2004, the entire content of which is incorporated herein by reference.

FIELD OF THE INVENTION

The invention relates to an intake arrangement for a two-stroke engine including a two-stroke engine for a portable handheld work apparatus such as a motor-driven chain saw, brushcutter or the like.

BACKGROUND OF THE INVENTION

U.S. Pat. No. 6,889,637 discloses an intake arrangement for a two-stroke engine wherein the intake channel is partitioned by a partition wall into an air channel and a mixture channel downstream of a throttle flap. The partition wall has an opening in the region of the throttle flap and this opening is closed by the throttle flap in the full-load position thereof. In the idle position of the throttle flap, fuel from the mixture channel can reach the air channel via the connecting opening. In this way, the wall of the air channel is wetted with fuel during idle. The fuel deposited on the intake channel wall can abruptly separate therefrom when there is a pivoting or swinging of the intake arrangement, that is, especially when there is a swinging of the portable handheld work apparatus so that a large quantity of fuel is supplied all at once to the two-stroke engine. This leads to a rough running of the two-stroke engine. At the same time, poor exhaust-gas values of the two-stroke engine result.

SUMMARY OF THE INVENTION

It is an object of the invention to provide an intake arrangement of the kind described above which permits a uniform running of the two-stroke engine even during pivoting or swinging.

The intake arrangement of the invention is for a two-stroke engine and includes: an intake channel; a throttle flap disposed in the intake channel and having a throttle shaft; the throttle shaft being pivotally mounted in the intake channel to permit the throttle flap to move into and out of an idle position whereat the throttle flap substantially closes the intake channel; a partition wall mounted in the intake channel downstream of the throttle flap for partitioning the intake channel into an air channel and a mixture channel; a fuel opening disposed in the intake channel downstream of the throttle flap to open into the mixture channel when the throttle flap is in the idle position; the throttle shaft and the partition wall conjointly defining a connecting opening between the air channel and the mixture channel when the throttle flap is in the idle position; and, a shield disposed in the mixture channel between the fuel opening and the connecting opening.

The shield is mounted in the flow path between the fuel opening and the connecting opening in the mixture channel and prevents that large fuel quantities can be inducted into the air channel. In this way, the degree of wetting of the air channel with fuel is reduced. The fuel quantity, which can deposit on the channel wall in the intake channel, is less so that the fuel quantity, which is inducted abruptly into the engine during swinging of the engine, is less. The running of the two-stroke engine is thereby quieter and more independent of the swinging of the engine.

A small quantity of fuel passing into the air channel can be achieved in that the throttle flap lies against the shield in the idle position. In order to compensate for manufacturing tolerances in a simple manner and to achieve a good sealing between the shield and the throttle flap, it is provided that a sealing element is mounted on the shield at the end facing toward the throttle flap. The throttle flap lies against this sealing element in the idle position. The sealing element is advantageously a sealing lip.

The connecting opening is configured as a gap between the partition wall and the throttle flap in order to ensure that only small amounts of fuel reach the air channel in the part-load position. In this way, a small flow cross section of the connecting opening is realized in a simple manner in the idle position of the throttle flap. In order to only slightly influence the flow conditions in the intake channel, it is provided that the shield extends essentially parallel to the partition wall. A simple configuration results when the shield is configured to be essentially planar. The shield is advantageously held on the intake channel wall at the edges of the shield running in the direction of the longitudinal axis of the intake channel. The shield can, for example, be held in slots in the intake channel wall which run in the longitudinal direction of the intake channel. However, other means can be used for attaching the shield in the intake channel.

In the channel section downstream of the throttle flap, the shield partitions the mixture channel into a first component channel, into which the fuel opening opens, and a second component channel. The flow cross section of the first component channel is 3% to 50% (preferably 5% to 30%) of the flow cross section of the mixture channel in this channel section. A pass over of fuel from the first component channel into the second component channel is substantially prevented by the separation of the two component channels.

In order to obtain a substantial separation of the mixture channel from the air channel also in the full-load position of the throttle flap, the partition wall is provided with a step against which the throttle flap lies in the full-load position. The throttle flap and the fuel opening are arranged in a carburetor and the shield projects beyond the housing of the carburetor at its downstream end. In this way, it can be substantially avoided that fuel is drawn by suction from the mixture channel into the air channel around the shield. A simple configuration of the partition wall can be achieved in that a flange is arranged downstream of the carburetor and a partition wall section is configured as one piece with the flange. The partition wall section, which is configured as one piece with the flange, projects especially into the carburetor. A partition wall section is arranged upstream of the throttle flap in order to prevent a passage of fuel from the mixture channel into the air channel upstream of the throttle flap.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
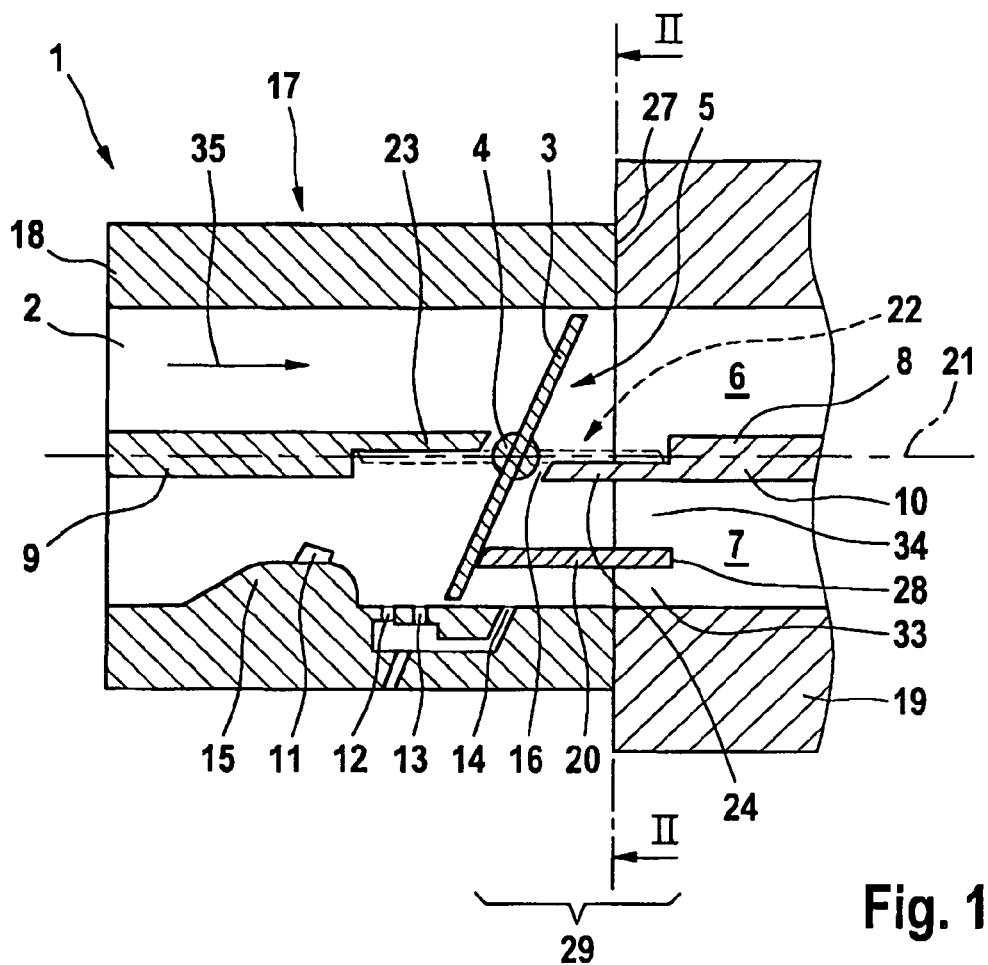
FIG. 1 is a longitudinal section view through an intake arrangement according to an embodiment of the invention.

The intake arrangement 1 shown in FIG. 1 functions to supply combustion air to a two-stroke engine and especially a two-stroke engine in a portable handheld work apparatus such as a motor-driven chain saw, brushcutter or the like. The intake arrangement 1 includes an intake channel 2 wherein a throttle flap 3 is pivotally journalled with a throttle shaft 4. The throttle flap 3 is mounted in a carburetor 17. An air filter (not shown) can be mounted upstream of the carburetor 17 referred to the flow direction 35.

A flange 19 is arranged downstream of the carburetor 17 and this flange can, for example, be the flange of the two-stroke engine. The flange 19 can, however, also be an intermediate flange. The intake channel 2 is partitioned by a partition wall 8 into an air channel 6 and a mixture channel 7. A partition wall section 9 extends upstream of the throttle flap 3 and a partition wall section 10 extends downstream of the throttle flap 3. Advantageously, the partition wall 8 extends over the entire length of the intake channel 2. However, a partition wall 8 can be configured only downstream of the throttle flap 3.

Substantially fuel-free air is supplied to the two-stroke engine by the air channel 6. The substantially fuel-free air functions especially to scavenge the combustion chamber. The air channel 6 opens into the transfer channels of the two-stroke engine which connect the combustion chamber of the engine to the crankcase at pregiven positions of the piston.

A primary fuel opening 11 and several idle openings (12, 13, 14) are provided for the supply of fuel to the mixture channel 7. The primary fuel opening 11 and the idle openings (12, 13, 14) open into the mixture channel 7 in the carburetor 17. The primary fuel opening 11 is arranged in the region of a venturi section 15 which is configured in the mixture channel 7. In the idle position 5 of the throttle flap 3 shown in FIG. 1, the idle openings 12 and 13 are disposed upstream of the throttle flap 3 while the idle opening 14 is arranged downstream of the throttle flap 3. Also, in the idle position of the throttle flap 3 shown in FIG. 1, the combustion air is drawn by suction from the mixture channel 7 through the idle openings 12 and 13 and enters into the mixture channel 7 via the idle opening 14 downstream of the throttle flap 3.

A shield 20 is mounted in the mixture channel 7 downstream of the throttle flap 3. The shield 20 runs in the direction of the longitudinal axis 21 of the intake channel approximately parallel to the partition wall 8. The shield 20 extends between the idle opening 14 and a connecting opening 16. The connecting opening 16 is formed downstream of the throttle flap 3 between the throttle flap 3 and the partition wall 8 and is configured as a narrow gap in the embodiment.

The full-load position 22 of the throttle flap 3 is shown in phantom outline in FIG. 1. In this full-load position 22, the throttle flap 3 only insignificantly influences the flow cross section in the intake channel 2 and, in this position, the connecting opening 16 is closed by the throttle flap 3. In the full-load position, the throttle flap 3 lies against a step 23 on the partition wall section 9 and against a step 24 on the partition wall section 10.

In the idle position of the throttle flap 3, the shield 20 extends from the throttle flap 3 in the direction toward the flange 19 and projects with its downstream end 28 beyond the side 27 of the carburetor housing 18 into the flange 19. The side 27 of the carburetor housing lies downstream. In the idle position 5, the throttle flap 3 lies against the shield 20. The shield 20 extends beyond a channel section 29 downstream of the throttle flap 3 between the idle opening 14 and the connecting opening 16.

Figure 2:
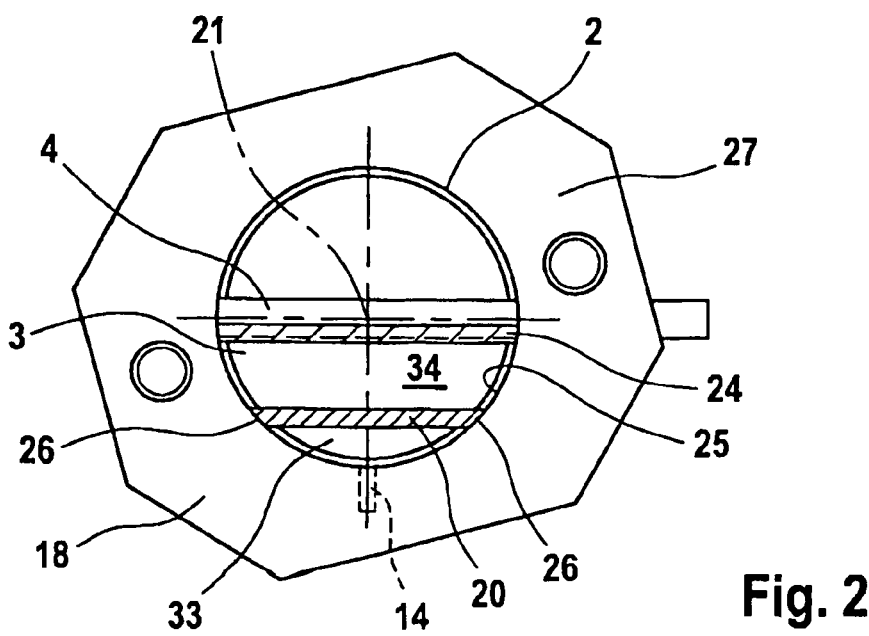
FIG. 2 is a plan view of the carburetor of the intake arrangement of FIG. 1 taken along line II—II in FIG. 1.

As shown in FIG. 2, the shield 20 is held in the intake channel wall 25 at its sides 26 which run parallel to the longitudinal axis of the intake channel. The shield 20 is configured to be planar and partitions the mixture channel 7 in the channel section 29 into a first component channel 33, into which the idle opening 14 opens, and into a second component channel 34 which extends between the partition wall 8 and the shield 20. The flow cross section of the first component channel 33 is 3% to 50% and is especially 5% to 30% of the flow cross section of the mixture channel 7.

The partition wall section 10 is arranged downstream of the throttle flap 3 and is advantageously configured as one piece with the flange 19; whereas, the partition wall section 9, which is configured upstream of the throttle flap 3, is advantageously configured as one piece with the carburetor housing 18. In this way, there is a low number of individual parts thereby facilitating the manufacture and the assembly of the intake arrangement 1.

Figure 3:
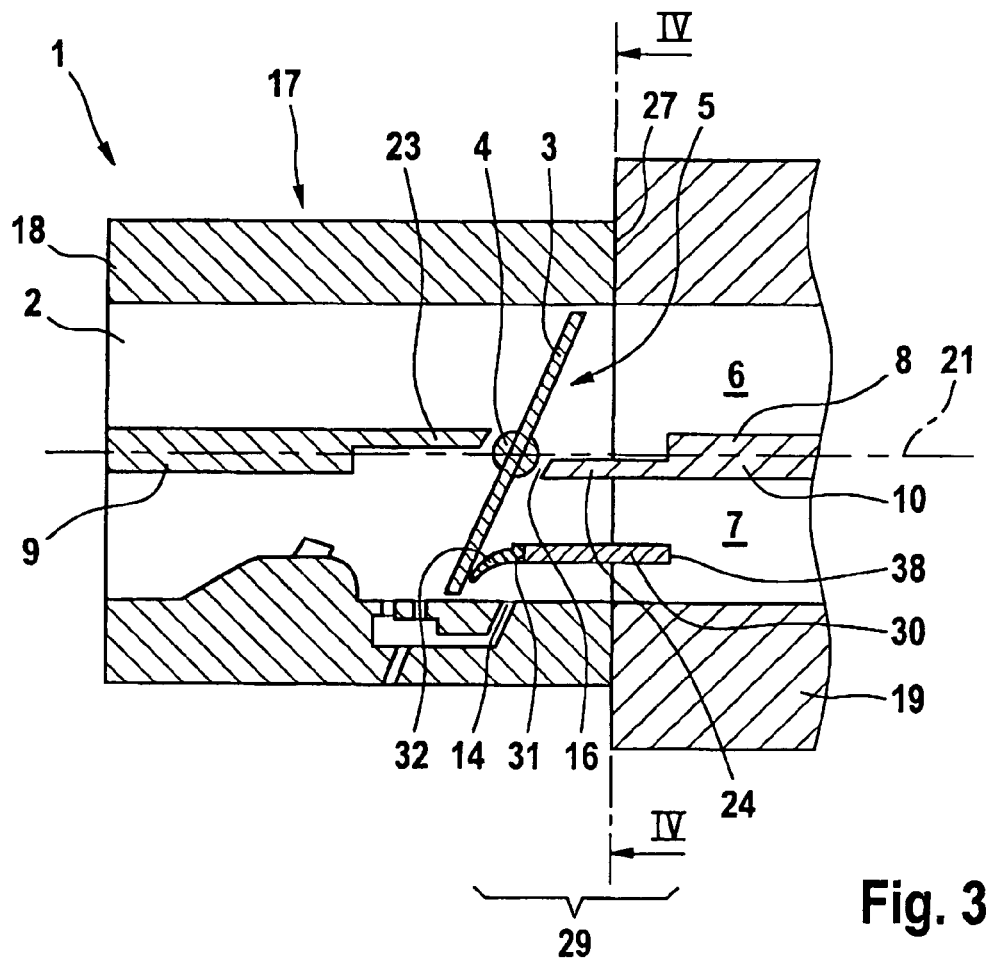
FIG. 3 is a longitudinal section view of an intake arrangement in accordance with another embodiment of the invention; and, FIG. 4 is a plan view of the carburetor of the intake arrangement of FIG. 3 along line IV—IV in FIG. 3.
Figure 4:
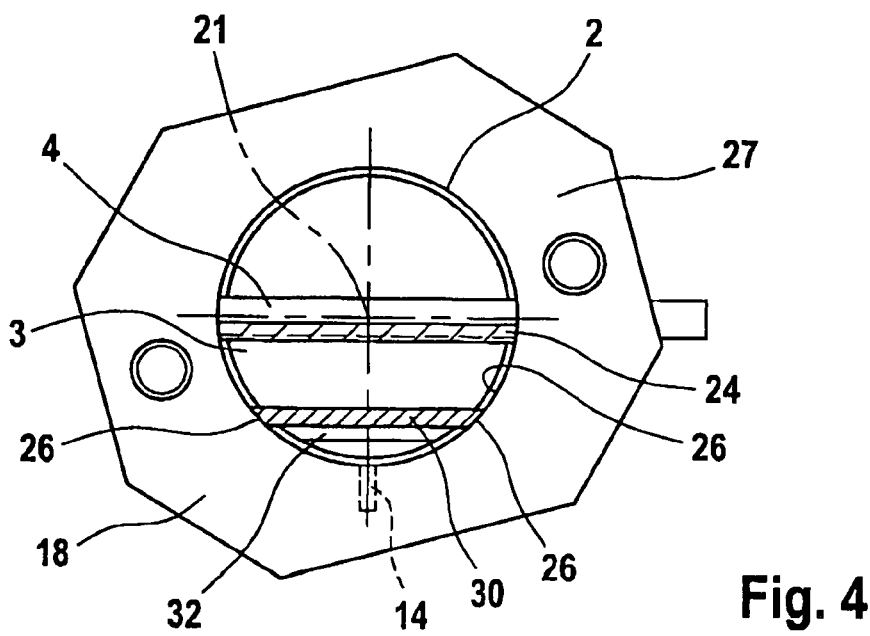

Another embodiment of an intake arrangement 1 is shown in FIGS. 3 and 4. The same reference numerals identify like elements already described with respect to FIGS. 1 and 2.

In the mixture channel 7 of the intake arrangement 1 shown in FIGS. 3 and 4, a shield 30 is arranged between the idle opening 14 and the connecting opening 16. The shield 30 is held on the intake channel wall 25 at its edges 26 which run parallel to the longitudinal axis 21 of the intake channel and extends approximately parallelly to the partition wall 8. The downstream end 38 of the shield 30 projects beyond the downstream side 27 of the carburetor housing 18 into the flange 19. A sealing element is arranged at the opposite-lying end 31 of the shield 30 which lies upstream and this sealing element is configured as a sealing lip 32. In the idle position 5 of the throttle flap 3 shown in FIG. 3, the throttle flap 3 lies against the sealing lip 32 so that the shield 30 separates the idle opening 14 from the connecting opening 16 in the channel section 29.

It can be advantageous that the shield extends over a larger or smaller channel section 29. It can also be provided that the shield does not extend over the entire width of the intake channel so that no complete partition of the mixture channel into two component channels 33 and 34 is achieved. The shield can also be configured to be arcuate. The shield can also be at a distance to the throttle flap 3 in the idle position of the throttle flap so long as a direct passing of fuel from the idle opening 14 via the connecting opening 16 into the air channel 6 is avoided.

It is understood that the foregoing description is that of the preferred embodiments of the invention and that various changes and modifications may be made thereto without departing from the spirit and scope of the invention as defined in the appended claims.

What is claimed is:

1. An intake arrangement for a two-stroke engine, the intake arrangement comprising:
    an intake channel;
    a throttle flap disposed in said intake channel and having a throttle shaft;
    said throttle shaft being pivotally mounted in said intake channel to permit said throttle flap to move into and out of an idle position whereat said throttle flap substantially closes said intake channel;

a partition wall mounted in said intake channel downstream of said throttle flap for partitioning said intake channel into an air channel and a mixture channel;

a fuel opening disposed in said intake channel downstream of said throttle flap to open into said mixture channel when said throttle flap is in said idle position;

said throttle shaft and said partition wall conjointly defining a connecting opening between said air channel and said mixture channel when said throttle flap is in said idle position; and, a shield disposed in said mixture channel between said fuel opening and said connecting opening.

2. The intake arrangement of claim 1, wherein said throttle flap lies against said shield when in said idle position.

3. The intake arrangement of claim 2, wherein said shield has an end facing toward said throttle flap; and, wherein said intake arrangement further comprises a sealing element at said end of said shield against which said throttle flap lies in said idle position.

4. The intake arrangement of claim 3, wherein said sealing element is a sealing lip.

5. The intake arrangement of claim 1, wherein said partition wall and said throttle flap are configured to define a gap defining said connecting opening.

6. The intake arrangement of claim 1, wherein said shield extends substantially parallel to said partition wall.

7. The intake arrangement of claim 1, wherein said shield is configured to be essentially planar.

8. The intake arrangement of claim 1, wherein said intake channel defines a longitudinal axis; said shield has edges running in the direction of said longitudinal axis; and, said shield is held at said edges on the wall of said intake channel.

9. The intake arrangement of claim 1, wherein said shield subdivides said mixture channel downstream of said throttle flap into a first component channel into which said fuel opening opens and into a second component channel.

10. The intake arrangement of claim 9, wherein the flow cross section of said first component channel is 3% to 50% of the cross section of said mixture channel.

11. The intake arrangement of claim 9, wherein said flow cross section of said first component channel is 5% to 30% of the cross section of said mixture channel.

12. The intake arrangement of claim 1, wherein said partition wall has a step formed therein against which said throttle flap lies when said throttle flap is in a full load position.

13. The intake arrangement of claim 1, wherein said intake arrangement further comprises a carburetor having a housing defining at least a portion of said intake channel; said throttle flap and said fuel opening being arranged in said carburetor; and, said shield having a downstream end which projects beyond said housing.

14. The intake arrangement of claim 13, wherein said intake arrangement further comprises a flange downstream of said carburetor and a section of said partition wall is formed as one piece with said flange.

15. The intake arrangement of claim 14, wherein said section of said partition wall projects into said carburetor.

16. The intake arrangement of claim 1, wherein a section of said partition wall is disposed upstream of said throttle flap.

17. The intake arrangement of claim 1, wherein said intake arrangement is disposed in a portable handheld work apparatus.

* * * * *